(12) United States Patent
Armiroli

(10) Patent No.: US 8,413,439 B2
(45) Date of Patent: Apr. 9, 2013

(54) POWER SUPPLY FOR ONBOARD EQUIPMENT OF AN AUTOMOBILE

(75) Inventor: Paul Armiroli, Marolles en Brie (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 0 days.

(21) Appl. No.: 12/741,154

(22) PCT Filed: Oct. 10, 2008

(86) PCT No.: PCT/FR2008/051839
§ 371 (c)(1),
(2), (4) Date: May 3, 2010

(87) PCT Pub. No.: WO2009/063149
PCT Pub. Date: May 22, 2009

(65) Prior Publication Data
US 2010/0263640 A1    Oct. 21, 2010

(30) Foreign Application Priority Data
Nov. 12, 2007   (FR) ...................................... 0758958

(51) Int. Cl.
*F02B 33/44*   (2006.01)
*F02B 33/00*   (2006.01)
*H02P 3/14*    (2006.01)
*H02P 3/18*    (2006.01)

(52) U.S. Cl.
USPC ............... 60/607; 60/608; 123/565; 318/376; 903/903; 903/907; 903/947

(58) Field of Classification Search ..................... 60/607, 60/608; 123/565; 318/376; 903/903–907, 903/947
See application file for complete search history.

(56) References Cited

U.S. PATENT DOCUMENTS

| | | | |
|---|---|---|---|
| 4,798,257 A * | 1/1989 | Kawamura et al. | ........... 180/165 |
| 5,552,681 A | 9/1996 | Suzuki et al. | |
| 6,365,983 B1 * | 4/2002 | Masberg et al. | ........... 290/40 C |

FOREIGN PATENT DOCUMENTS

| | | | |
|---|---|---|---|
| DE | 30 42 478 | | 6/1982 |
| JP | 09032567 A | * | 2/1997 |
| JP | 09 252546 | | 9/1997 |
| JP | 2004 328988 | | 11/2004 |

* cited by examiner

Primary Examiner — Kenneth Bomberg
Assistant Examiner — Audrey K Bradley
(74) Attorney, Agent, or Firm — Berenato & White, LLC

(57) ABSTRACT

A power supply of equipment onboard a motor vehicle equipped with a micro-hybrid system that can operate in a regenerative braking mode during which the energy recovered by a reversible rotary machine (1) of the micro-hybrid system is stored in an auxiliary energy storage unit (4). The micro-hybrid system provides a dual-voltage network including, on the one hand, a low voltage (Vb) for supplying a battery (3) of the vehicle and, on the other hand and at the terminals of said auxiliary energy-storage unit, a floating voltage (Vb+X) higher than the low voltage. The floating voltage (Vb+X) is used for powering the onboard equipment of the vehicle that may require high currents during short periods of time for the dynamic operation thereof. The power supply is particularly useful for powering an electric-assistance turbocharger.

2 Claims, 1 Drawing Sheet

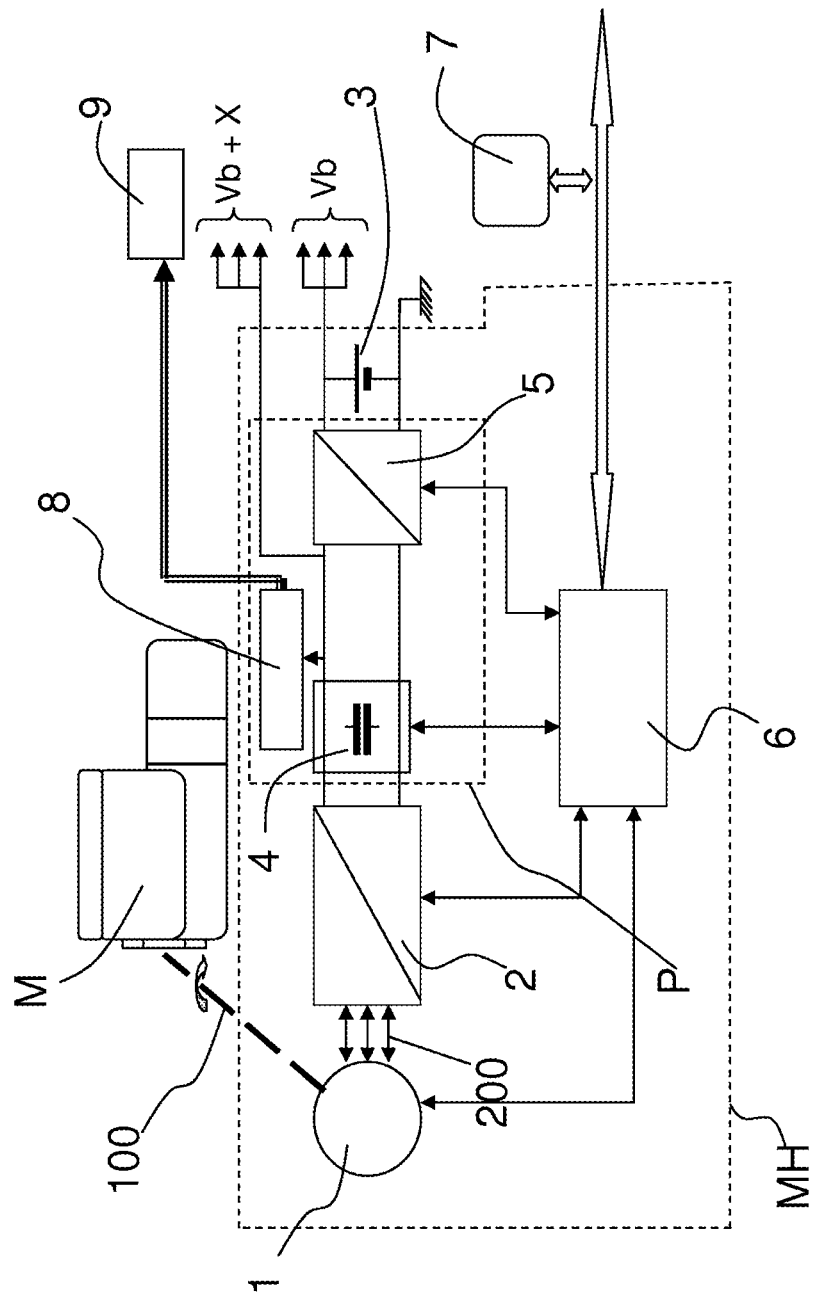

POWER SUPPLY FOR ONBOARD EQUIPMENT OF AN AUTOMOBILE

FIELD OF THE INVENTION

The present invention relates to the field of motor vehicles, and concerns the supply of electrical devices, more specifically in the case when these vehicles are equipped with a recuperative braking system.

BACKGROUND OF THE INVENTION

It concerns the use of a specific electrical supply network associated with the presence of the recuperative braking system, and its object is an electrical supply system which is particularly well suited to equipment, the functioning of which generates large requirements for current over short periods of time, and the electrical supply of which must be provided within short response times, so as to permit dynamic functioning of the said equipment. Its object is also a micro-hybrid system which is designed for implementation of this system.

By way of example, in a vehicle, the equipment of this type which requires an electrical supply with short response times comprises in particular:

- the so-called "e-turbo" electrically assisted turbo-compressor, or the so-called "e-charger" supercharger, this equipment typically requiring electrical power levels of 1 to 2 kW for a duration of 1 to 2 s. These power levels and durations can be higher, but without exceeding 3 kW and 3 s respectively. The response time of the supply must generally be less than a few tens of milliseconds;
- the electric assisted steering, which in transitory conditions consumes current of between 25 and 100 A for durations of 1 to 2 ms;
- the electric pump unit, which may require a current of approximately 100 A for a duration of approximately 200 ms; and
- the electro-magnetically controlled valves which may require a current of approximately 40 A for a duration of 1 to 140 ms.

The conventional electrical supply network of a motor vehicle usually comprises two sources of current, i.e. the battery (commonly a lead battery), and the alternator. However, these sources are both badly suited to supply with short response times to electrical equipment which can moreover generate strong demands for current or voltage.

In fact, the response time of a conventional alternator, of approximately a hundred milliseconds, is too lengthy to fulfil a need of this type.

The lead battery is also badly suited to cyclical supply, with short response times, of high current peaks, particularly because the discharge cycles which are then imposed on it contribute towards accelerating its ageing. Other types of battery could fulfil this need, but they are too costly to be able to envisage putting them into place on a mass-produced motor vehicle.

According to a first one of its characteristics, in vehicles which are equipped with micro-hybrid systems which can function in recuperative braking mode, the invention proposes the use of a specific electrical supply network associated with this functioning mode, in order to supply, with short response times, equipment of the vehicle which can moreover generate relatively large current requirements in dynamic functioning.

In a known manner, micro-hybrid systems, for example with an alternator-starter, make it possible to reduce the fuel consumption of a vehicle, and can function in recuperative braking mode. These systems generally comprise a reversible rotary electric machine, a reversible AC/DC converter, an auxiliary energy storage unit, and a reversible DC/DC converter, as well as a device for electronic control of the assembly. Preferably, the auxiliary energy storage unit consists of the association of a plurality of elementary capacitive cells with a very large capacity, which are also known as "super-capacitors". The auxiliary energy storage unit and the reversible DC/DC converter form the "power pack" of the micro-hybrid system.

Also in a known manner, the electrical energy which is recuperated by means of the rotary electric machine, for example when the assembly is functioning in recuperative braking mode, is stored in the auxiliary energy storage unit. The micro-hybrid system with recuperative braking provides a dual voltage network which is capable of providing firstly a direct floating voltage which is obtained at the terminals of the auxiliary energy storage unit, and secondly a low direct voltage at the terminals of the lead battery. The floating direct voltage which is known as "14+X voltage" is higher than the voltage at the terminals of the said lead battery which supplies the 12V electrical supply network in a conventional manner.

The capacitive elements of the auxiliary energy storage unit make it possible to supply high current during short periods, and also make possible the supply of current with a very short response time, which is compatible with the supply to specific electrical equipment of the vehicle.

SUMMARY OF THE INVENTION

According to a preferred embodiment of the invention, this "14+X" voltage is used more particularly in order to supply an electric motor to assist a turbo-compressor or supercharger of the thermal engine of the vehicle.

In fact, in a known manner, a turbo-compressor conventionally comprises a turbine which is rotated by the hot gases obtained from the combustion in the engine, which turbine in turn drives a compressor which is fitted on the same shaft. The air which is compressed by the compressor is then injected into the cylinders of the engine in order to improve the combustion within the latter.

The optimisation of the functioning of a turbo-compressor involves a decrease in its response time, and an increase in its functioning range (high and low speeds of the engine). In addition to the mechanical solutions, which consist for example of providing a turbine with variable geometry, or imparting rotary moment to the fluid before it enters the compressor, electrical assistance solutions are known wherein the insertion of an appropriate electric motor between the turbine and the compressor makes it possible to increase the range of optimum performance of a turbo-compressor of this type: a turbo-compressor of this type is then designated by the term "electrically assisted turbo-compressor".

However, the electric motors which make this assistance possible need a supply which can provide strong currents cyclically, and with a response time which is reduced to a minimum, such as to permit dynamic functioning comprising transient phenomena which require a good response of the electrical supply for high frequencies. The aforementioned "14+X" voltage network is thus well-suited for use of this type.

More specifically, the supply of the electric motor for assistance to a turbo-compressor is a supply in the form of pulses, generally obtained by means of a chopper, which itself is supplied by a direct voltage of the vehicle.

According to another characteristic of the invention, this chopper is integrated in the power pack of the "14+X" voltage network previously defined, and is supplied directly by the "14+X" floating direct voltage.

BRIEF DESCRIPTION OF THE DRAWINGS

The invention will now be described in greater detail by means of a preferred embodiment, and with reference to FIG. 1, which shows a process diagram for one of its preferred embodiments.

DETAILED DESCRIPTION

This FIGURE shows schematically the different elements of a micro-hybrid system MH which can function in recuperative braking mode.

The micro-hybrid system MH comprises a reversible rotary electric machine 1 which is coupled mechanically (coupling represented schematically by a discontinuous line 100 in FIG. 1) to the thermal engine M of the vehicle. The reversible rotary electric machine 1, or alternator-starter, is connected to a reversible AC/DC converter 2 (connections 200).

When the rotary machine 1 is functioning in alternator mode, the converter 2 transforms the three-phase voltages which it supplies into a rectified direct voltage, on the basis of which super-capacitors of the auxiliary energy storage unit 4 and the lead battery 3 are charged.

When the rotary machine 1 is functioning in starter mode, it is then supplied by alternating three-phase voltages which are generated by the reversible AC/DC converter 2, on the basis of the direct voltage which is present at the terminals of the auxiliary energy storage unit 4.

On the basis of the rectified direct voltage which is supplied by the AC/DC converter 2 when the rotary electric machine 1 is functioning in alternator mode, as well as on the basis of the voltage which is present at the terminals of the auxiliary energy storage unit 4, a reversible DC/DC converter 5 makes it possible to obtain a direct voltage Vb which is used to charge the battery 3 of the vehicle. The voltage Vb at the terminals of this battery is used to supply a certain number of items of electrical equipment on board the vehicle.

The auxiliary energy storage unit 4 and the reversible DC/DC converter 5 form the power pack P of the micro-hybrid system MH.

In addition, the energy which is stored in the auxiliary energy storage unit 4 can be used to supply the floating direct voltage network, which is known as the Vb+X voltage network. This floating direct voltage is greater than the battery voltage Vb. Commonly, since the battery charging voltage is habitually approximately 14 V, the voltage network Vb+X is also known as the "14+X network" by persons skilled in the art, as previously stated. It should be noted that a description of this type does not in any way limit the lead battery supply network voltage, or that of the floating direct voltage network which is associated with the micro-hybrid system MH with recuperative braking.

In association with an electronic unit 7 for control and command of the functioning of the engine, an electronic unit 6 provides the management of all the elements of the micro-hybrid system MH.

According to the invention, the voltage Vb+X is used for specific equipment of the vehicle, which, in order to function dynamically, requires supply with short response times of high currents, for short periods of time.

According to a preferred embodiment of the invention, schematised by FIG. 1, the voltage Vb+X is used to supply the chopper 8 which, in pulse power mode, supplies the electric motor for assistance to a turbo-compressor, represented schematically at 9 in the FIGURE.

In fact, as previously stated, the super-capacitors of the auxiliary storage unit 4 are well suited for the supply of current peaks with short response times.

According to another characteristic of the invention, illustrated in the embodiment represented in FIG. 1, the chopper 8, by means of which the electric motor for assistance to the turbo-compressor 9 is supplied, is integrated in the power pack P, which also comprises the auxiliary storage unit 4 and the DC/DC converter 5. This also makes it possible in particular to improve the compactness of the system.

The invention thus leads to the availability of a supply source with a short response time, and which is also compatible with the supply of high currents for short periods of time, this supply source functioning by means of the recuperative braking mode, i.e. without giving rise to the need to install the slightest additional component in the vehicle which is equipped with the micro-hybrid system. This makes it possible to limit the global consumption of the vehicle, whilst, in the preferred embodiment of the invention which is schematised in FIG. 1, obtaining a turbo-compressor, the performance levels of which can be optimised by means of the electrical assistance, thus leading to additional optimisation of the consumption of the said vehicle.

It should be noted however that the invention should not be limited to the embodiments described, and that it extends in particular to any equivalent means and any technical operative combination of these means. In particular, the invention is not limited to use of the "14+X" voltage which is associated with the micro-hybrid system MH for the supply to the turbo-compressor 9 or to an electric supercharger. It can be implemented for the supply of any electrical equipment of the vehicle which requires a supply source with a short response time for its dynamic functioning: by way of non-limiting example, the invention can also be implemented for the supply to assisted steering devices, electromagnetically controlled valves, and electric pump units which assure the circulation of fluids within the motor vehicle.

The invention claimed is:

1. A combination, in a motor vehicle, of a micro-hybrid system and equipment on board the vehicle, the micro-hybrid system being able to function in recuperative braking mode, and comprising:
   at least one reversible rotary electric machine (1),
   an AC/DC converter (2),
   an auxiliary energy storage unit (4),
   a DC/DC converter (5), and
   one of an electrically assisted turbo-compressor (9) and a supercharger associated with the engine of the motor vehicle and supplied in pulse mode by a chopper (8);
   the one of the electrically assisted turbo-compressor (9) and the supercharger consuming for its dynamic functioning electric currents for periods of time;
   the micro-hybrid system being able, during phases of recuperative braking of the motor vehicle, to supply the auxiliary energy storage unit (4) so as to generate a dual voltage network which has a low voltage (Vb) to supply a battery (3) of the vehicle, and, at terminals of the auxiliary energy storage unit (4), a floating voltage (Vb+X) higher than the low voltage;
   the one of the electrically assisted turbo-compressor (9) and the supercharger is provided with response times by the floating voltage (Vb+X);
   the chopper (8) being supplied by the floating voltage (Vb+X).

2. The combination according to claim 1, wherein the auxiliary energy storage unit (4) and the DC/DC converter (5) form a power pack (P) of the micro-hybrid system in which the chopper (8) is incorporated.

\* \* \* \* \*